US010691869B2

(12) United States Patent
Abouelseoud et al.

(10) Patent No.: US 10,691,869 B2
(45) Date of Patent: Jun. 23, 2020

(54) PATTERN-BASED OPTICAL PROXIMITY CORRECTION

(71) Applicant: Mentor Graphics Corporation, Wilsonville, OR (US)

(72) Inventors: Ahmed Abouelseoud, Wilsonville, OR (US); Sherif Hany Riad Mohammed Mousa, Beaverton, OR (US); Jonathan James Muirhead, Portland, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 16/256,518

(22) Filed: Jan. 24, 2019

(65) Prior Publication Data

US 2019/0266311 A1 Aug. 29, 2019

Related U.S. Application Data

(60) Provisional application No. 62/634,857, filed on Feb. 24, 2018.

(51) Int. Cl.
| | |
|---|---|
| *G06F 17/50* | (2006.01) |
| *G06F 30/398* | (2020.01) |
| *G03F 1/00* | (2012.01) |
| *G03F 1/36* | (2012.01) |
| *G06F 30/392* | (2020.01) |

(52) U.S. Cl.
CPC .......... *G06F 30/398* (2020.01); *G03F 1/144* (2013.01); *G03F 1/36* (2013.01); *G06F 30/392* (2020.01)

(58) Field of Classification Search
CPC .. G06F 30/398; G06F 30/392; G06F 2119/18; G03F 1/36; G03F 1/144
USPC ......................................................... 716/112
See application file for complete search history.

(56) References Cited

U.S. PATENT DOCUMENTS

| | | | | |
|---|---|---|---|---|
| 7,318,214 | B1 * | 1/2008 | Prasad ..................... | G03F 1/36 716/53 |
| 7,353,492 | B2 * | 4/2008 | Gupta ....................... | G03F 1/36 716/53 |
| 7,814,456 | B2 * | 10/2010 | Gupta ....................... | G03F 1/36 716/100 |
| 2010/0175043 | A1 * | 7/2010 | Mukherjee ............... | G03F 1/36 716/53 |

\* cited by examiner

*Primary Examiner* — Jack Chiang
*Assistant Examiner* — Brandon Bowers

(57) ABSTRACT

Aspects of the disclosed technology relate to techniques of pattern-based resolution enhancement. Surrounding areas for a plurality of geometric layout elements in a layout design are partitioned into geometric space elements. The plurality of geometric layout elements and the geometric space elements are grouped, through pattern classification, into geometric layout element groups and geometric space element groups, respectively. Optical proximity correction is performed for each of the geometric layout element groups and sub-resolution assist feature insertion is performed for each of the geometric space element groups. The results are applied to the plurality of geometric layout elements and the geometric space elements in the layout design.

20 Claims, 11 Drawing Sheets

Flow chart 500

PATTERN-BASED OPTICAL PROXIMITY CORRECTION

RELATED APPLICATIONS

This application claims the benefit of U.S. Provisional Patent Application No. 62/634,857, filed on Feb. 24, 2018, and naming Ahmed Abouelseoud et al. as inventors, which application is incorporated entirely herein by reference.

FIELD OF THE DISCLOSED TECHNOLOGY

The present disclosed technology relates to the field of circuit design and manufacture. Various implementations of the disclosed technology may be particularly useful for using resolution enhancement techniques to modify layout designs for lithography.

BACKGROUND OF THE DISCLOSED TECHNOLOGY

As designers and manufacturers continue to shrink the size of circuit components, the shapes reproduced on the substrate through photolithography become smaller and are placed closer together. This reduction in feature size and spacing increases the difficulty of faithfully reproducing the image intended by the design layout onto the substrate and can create flaws in the manufactured device. To address the problem, one or more resolution enhancement techniques are often employed to improve the resolution of the image that the mask forms on the substrate during the photolithographic process.

One of resolution enhancement techniques, "optical proximity correction" or "optical process correction" (OPC), attempts to compensate for light diffraction effects. When light illuminates the photomask, the transmitted light diffracts, with light from regions with higher special frequencies diffracting at higher angles. The resolution limits of the lens in a photolithographic system make the lens act effectively as a low-pass filter for the various spatial frequencies in the two-dimensional layout. This can lead to optical proximity effects such as a pull-back of line-ends from their desired position, corner rounding, and a bias between isolated and dense structures. The optical proximity correction adjusts the amplitude of the light transmitted through a lithographic mask by modifying the layout design data employed to create the photomask. For example, edges in the layout design may be adjusted to make certain portions of the geometric elements larger or smaller, in accordance with how much additional light exposure (or lack of exposure) is desired at certain points on the substrate. When these adjustments are appropriately calibrated, overall pattern fidelity (printed vs. targeted) is greatly improved, thereby reducing optical proximity effects.

In addition to the edge adjustment, sub-resolution assist features (SRAF) are often inserted to address the iso-dense bias problem. Sub-resolution assist features, sometimes also known as "scattering bars," are themselves too small to be resolved by the imaging system. When they are inserted into the layout, sub-resolution assist features can, however, provide a dense-like environment for isolated features. As such, isolated features will print more like dense features.

One challenge for applying the resolution enhancement techniques is computation time and costs. For a design having hundreds of millions of or even billions of gates, an optical proximity correction and sub-resolution assist features insertion process can require thousands of processors to operate for multiple days. Any technique that can speed up the process and/or require less computing resources is highly desirable.

Another challenge is consistency. Numerical noise caused by computation involved can lead to different corrections for the same layout pattern in different locations. While the deviations are usually small, it is desirable for a resolution enhancement tool to produce a consistent result for the same layout patterns. This is particularly true for designs with repetitive patterns such as memory cells.

BRIEF SUMMARY OF THE DISCLOSED TECHNOLOGY

Aspects of the disclosed technology relate to techniques of pattern-based resolution enhancement for lithography. In one aspect, there is a method comprising: receiving a layout design; partitioning surrounding areas for a plurality of geometric layout elements in the layout design into geometric space elements, the surrounding areas being layout areas having no geometric layout elements; performing pattern classification to divide the plurality of geometric layout elements into geometric layout element groups and the geometric space elements into geometric space element groups based on layout patterns of which each comprises one of the plurality of the geometric layout elements and layout patterns of which each comprises one of the geometric space elements, respectively; performing optical proximity correction on layout patterns of which each comprises one of one or more members in one of the geometric layout element groups and sub-resolution assist feature insertion on layout patterns of which each comprises one of one or more members in one of the geometric space element groups; extracting a modified geometric layout element for each of the geometric layout element groups from results of the optical proximity correction and sub-resolution assist features for each of the geometric space element groups from results of the sub-resolution assist feature insertion; generating a modified layout design, the generating comprising replacing the plurality of geometric layout elements with the corresponding modified layout elements and inserting into the geometric space elements the corresponding extracted sub-resolution assist features; and storing information of the modified layout design.

The method may further comprise: processing the modified layout design to generate mask data for a mask-writing tool to make photomasks. The method may still further comprise: applying the mask data to the mask-writing tool to create photomasks.

Some or all of the plurality of geometric layout elements may be obtained by fracturing/partitioning original geometric layout elements in the layout design. The plurality of geometric layout elements may be a sub-set of geometric layout elements in the layout design.

The layout pattern comprising a geometric layout element for the optical proximity correction operation may be larger than the corresponding layout pattern for the pattern classification operation. The optical proximity correction, the sub-resolution assist feature insertion, or both may be rule-based, model-based, inversion-lithography-based, or any combination thereof.

In another aspect, there is one or more computer-readable media storing computer-executable instructions for causing one or more processors to perform the above method.

In still another aspect, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Figure 1:
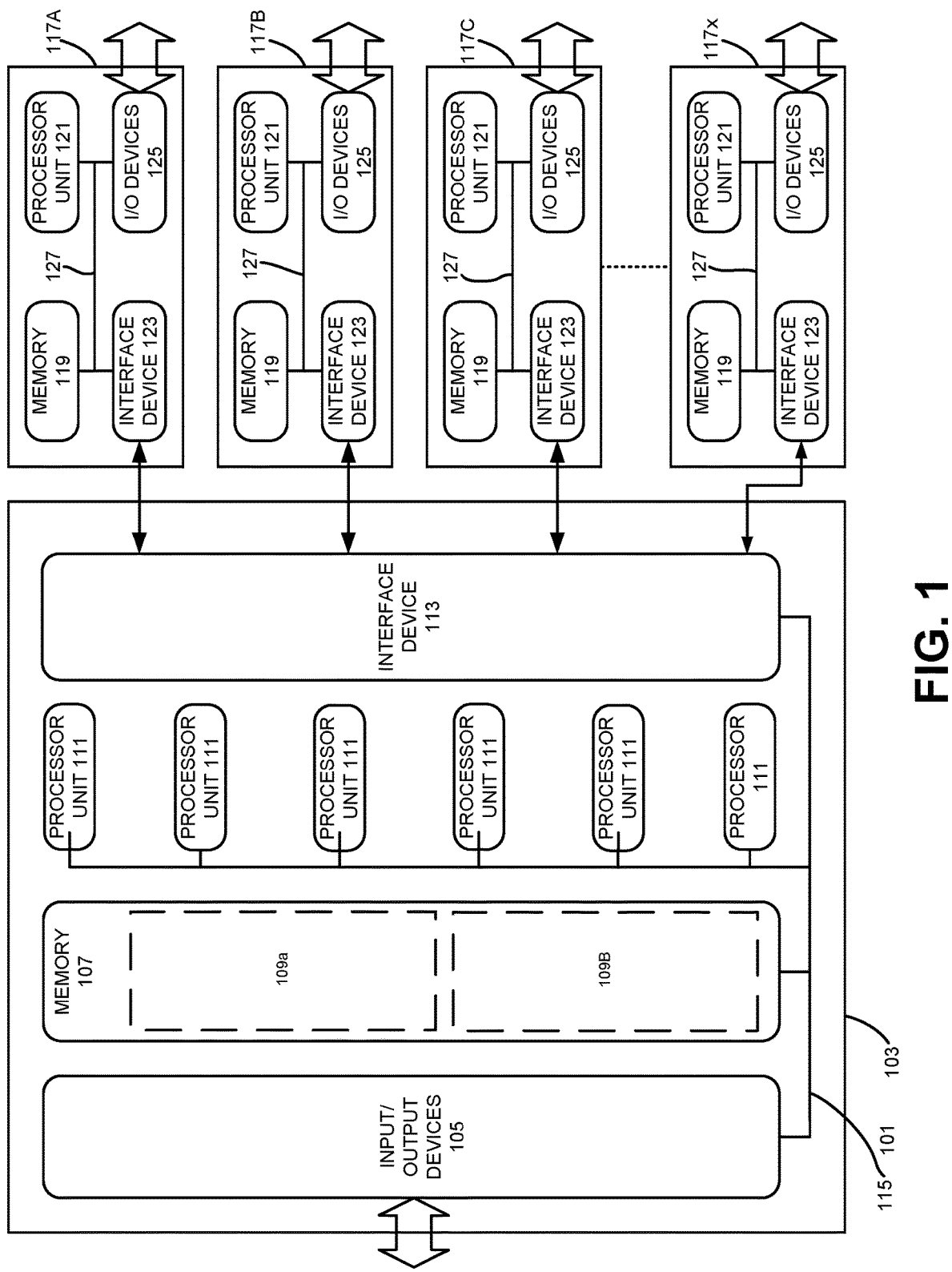
FIG. 1 illustrates an example of a computing system that may be used to implement various embodiments of the disclosed technology.

Various aspects of the present disclosed technology relate to techniques of pattern-based resolution enhancement for lithography. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "perform", "partition," and "extract" to describe the disclosed methods. Such terms are high-level descriptions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one micro device, such as data to be used to form multiple micro devices on a single wafer.

Illustrative Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
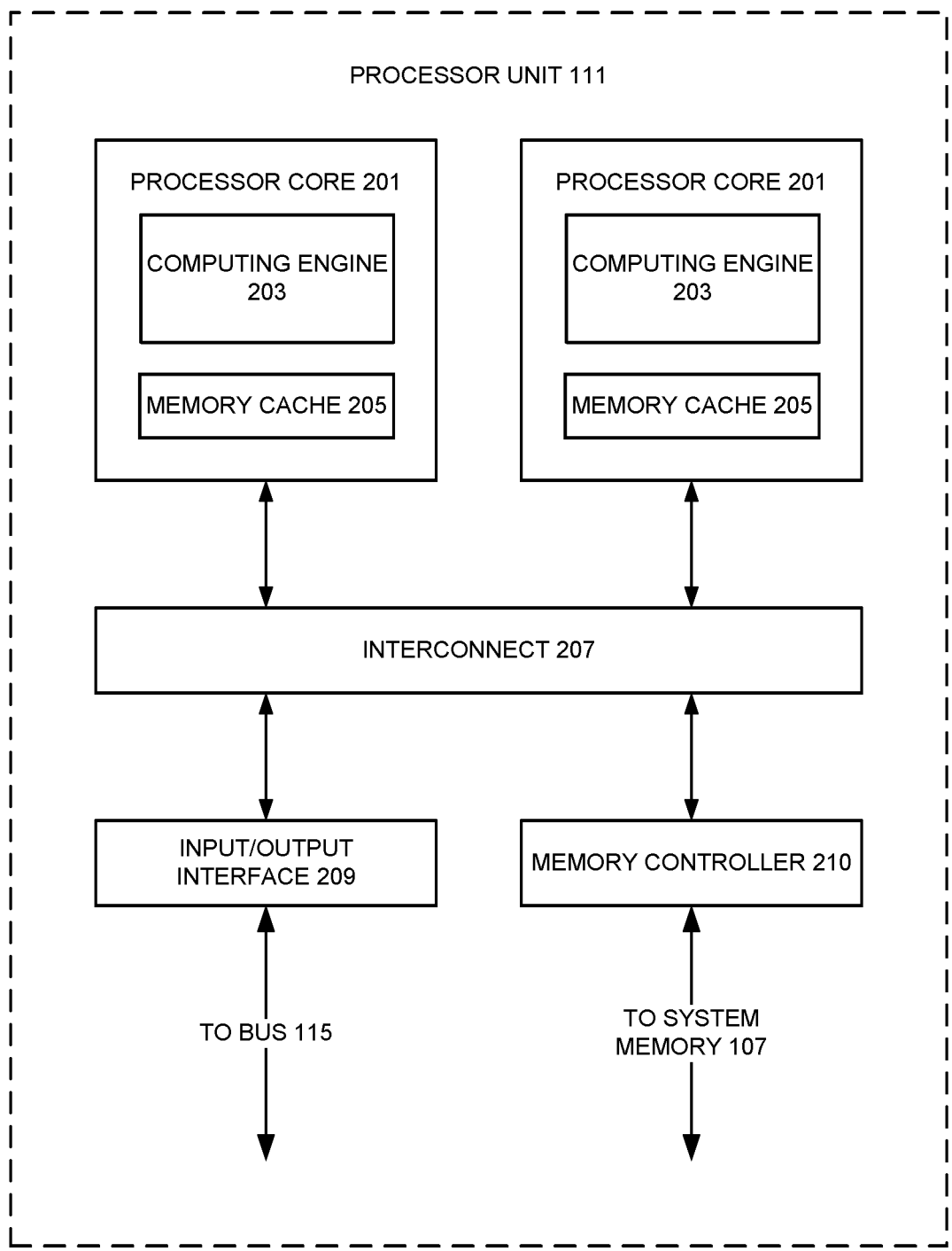
FIG. 2 illustrates an example of a multi-core processor unit that may be used to implement various embodiments of the disclosed technology.

With some implementations of the disclosed technology, the master computing device 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Circuit Design Flow and Resolution Enhancement Techniques

Electronic circuits, such as integrated microcircuits, are used in a variety of products, from automobiles to microwaves to personal computers. Designing and fabricating integrated circuit devices typically involves many steps, sometimes referred to as a "design flow." The particular steps of a design flow often are dependent upon the type of integrated circuit, its complexity, the design team, and the integrated circuit fabricator or foundry that will manufacture the microcircuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, automated place and route tools will be used to define the physical layouts, especially of wires that will be used to interconnect the circuit devices. Each layer of the microcircuit will have a corresponding layer representation in the layout design, and the geometric shapes described in a layer representation will define the relative locations of the circuit elements that will make up the circuit device. For example, shapes in the layer representation of a metal layer will define the locations of the metal wires used to connect the circuit devices. Custom layout editors, such as Mentor Graphics' IC Station or Cadence's Virtuoso, allow a designer to custom design the layout, which is mainly used for analog, mixed-signal, RF, and standard-cell designs.

Integrated circuit layout descriptions can be provided in many different formats. The Graphic Data System II (GDSII) format is a popular format for transferring and archiving two-dimensional graphical IC layout data. Among other features, it contains a hierarchy of structures, each structure containing layout elements (e.g., polygons, paths or polylines, circles and textboxes). Other formats include an open source format named Open Access, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in IC layout designs that are employed to manufacture integrated circuits. Once the microcircuit device design is finalized, the layout portion of the design can be used by fabrication tools to manufacture the device using a photolithographic process.

Typically, a designer will perform a number of verification processes on the layout design. For example, the layout design may be analyzed to confirm that it accurately represents the circuit devices and their relationships described in the device design. In this process, a LVS (layout versus schematic) tool extracts a netlist from the layout design and compares it with the netlist taken from the circuit schematic. LVS can be augmented by formal equivalence checking, which checks whether two circuits perform exactly the same function without demanding isomorphism.

The layout design also may be analyzed to confirm that it complies with various design requirements, such as minimum spacings between geometric elements and minimum linewidths of geometric elements. In this process, a DRC (design rule checking) tool takes as input a layout in the GDSII standard format and a list of rules specific to the semiconductor process chosen for fabrication. A set of rules for a particular process is referred to as a run-set, rule deck, or just a deck. An example of the format of a rule deck is the Standard Verification Rule Format (SVRF) by Mentor Graphics Corporation.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a photomask (mask) must be created to expose only the desired areas to the radiation, and to protect the other areas from exposure. The mask is created from circuit layout data. That is, the geometric elements described in a design layout define the relative locations or areas of the circuit that will be exposed to radiation through the mask. A mask or reticle writing tool is used to create the mask based upon the design layout, after which the mask can be used in a photolithographic process.

As discussed previously, one or more resolution enhancement techniques (RETs) are often employed to improve the resolution of the image that the mask forms on the substrate during the photolithographic process. One of these techniques is optical proximity correction (OPC). OPC can be rule-based, model-based, or both. In rule-based OPC, the proximity effects are characterized and specific solutions are devised for specific geometric configurations. The layout design is then searched using a DRC tool or a geometric-based software engine to find these geometric configurations. Once they are found, the specific solutions are applied.

Figure 3A:
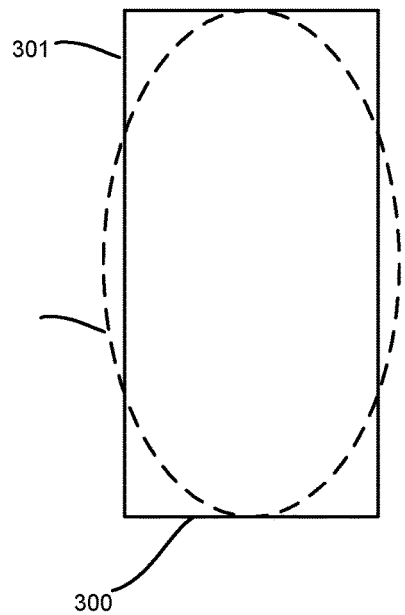
FIG. 3A illustrates a mask feature 300 and a simulated image of the mask feature.
Figure 3C:
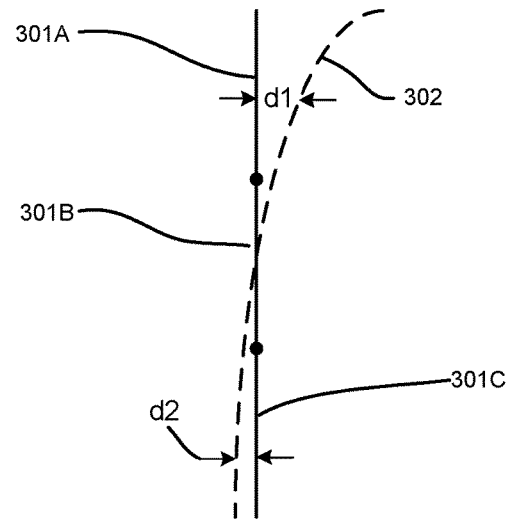
FIG. 3C illustrates edge displacement errors for some of the edge fragments.
Figure 3B:
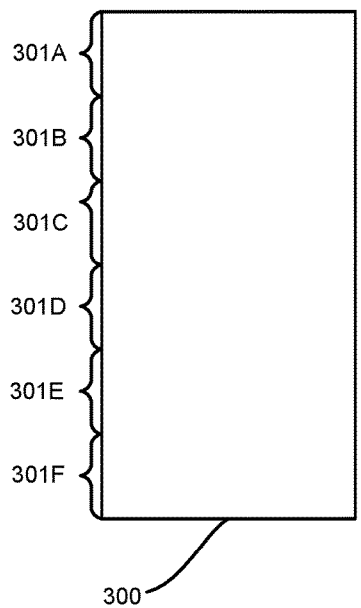
FIG. 3B illustrates an example of fragmentation of an edge of the mask feature 300.

Rule-based OPC approaches work well for simple cases. For complex layout features, however, model-based OPC approaches must be employed to obtain desired results. Model-based OPC performs simulation to predict the printed image, which guides layout modifications. In a typical model-based OPC process, polygons in the layout design are divided into edge fragments to allow the desired fine motion of edge fragments. FIGS. 3A-3D illustrates an example. An edge 301 of a layout feature 300 in FIG. 3A may be fragmented into edge fragments 301A-301F as shown in FIG. 3B. The size of the edge fragments and which particular edges are to be fragmented in a given layout design depends upon the OPC process parameters, often referred to as the OPC recipe. While not all edges within a layout design are fragmented in every OPC process, these edges may also be referred to as edge fragments. Simulation is performed to obtain the predicted printed image 302 for the layout feature 300 shown in FIG. 3A. This simulated image is compared to the target image. Typically, this comparison is done at each edge fragment. For example, as shown in FIG. 3C, the target image is a distance d1 away from the simulated image at the edge fragment 301A, the target image is a distance d2 away from the simulated image at the edge fragment 301C, while the target image intersects the simulated image at the edge fragment 301B. The distances between the target image and the simulated image are often referred to as edge placement error (EPE).

Figure 3D:
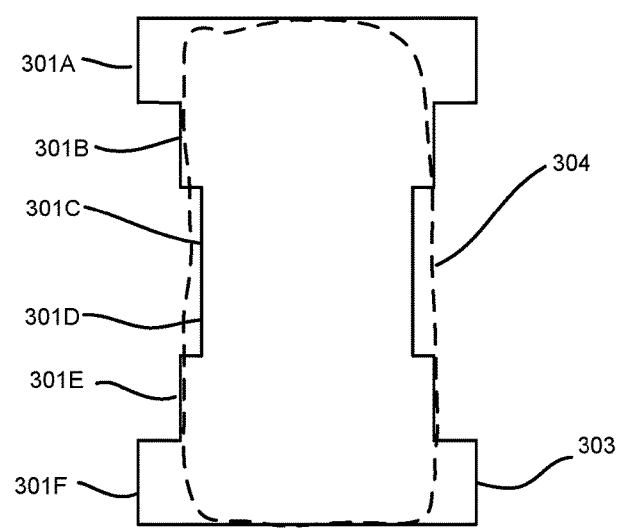
FIG. 3D illustrates a mask feature modified from the mask feature 300 by an OPC process and a corresponding simulated image.

Next, the edge fragments are individually moved or adjusted in order to enable the simulated image for the resulting mask to reproduce the target image as much as possible. For example, as shown in FIG. 3D, the edge fragment 301A is displaced in a direction away from the geometric element 301, in an effort to widen the corresponding portion of the image that would be produced by the resulting mask. Similarly, the edge fragment 301C is displaced in a direction toward from the geometric element 301, in an effort to narrow the corresponding portion of the image that would be produced by the resulting mask. Next, the image that would be produced by a mask using the displaced edge fragments is simulated, and the new simulated image is compared with the target image, and the edge placement error for each edge fragment is computed.

This process of moving the edge fragments, simulating the image that would be produced using the moved edge fragments, and comparing the simulated image to the target image may be repeated a number of times. Each cycle of moving edge fragments and comparing the new simulated image to target image is referred to as an iteration of the OPC process. Typically, edge fragments moved during a given iteration, and the distance the edge fragments are displaced, are determined based upon the edge placement error. For example, because d1 is larger than d2 in FIG. 3C, a subsequent iteration of the optical proximity correction process may move edge fragment 301A a greater amount than edge fragment 301C.

The movement value for each edge fragment, often referred to as edge adjustment values or edge displacement values, may be the edge placement error multiplied by a constant factor (feedback factor). This feedback factor may be location dependent or edge type dependent based on the OPC recipe. Methods that consider correlations between neighboring edge fragments such as those described in U.S. patent Ser. Nos. 14/183,209 and 14/183,228, which are incorporated herein by reference, may also be employed to derive the movement value (referred to as cross-MEEF (mask error enhancement factor)-based methods).

The OPC iteration process continues until the simulated image is sufficiently similar to the target image (e.g., both d1 and d2 are smaller than a threshold value), or until it is determined that the displacements of the edge fragments already have converged on locations where no further movement of the edge fragments will improve the simulated image. Once the final positions of the edge fragments are determined in the layout design data, as shown in FIG. 3D, a modified mask feature 303 can be created from the corrected layout design data. As shown in FIG. 3D, the image 304 produced by the modified mask feature 303 should more closely correspond to the target image.

While OPC based on modifying geometric shapes can certainly correct many proximity effects, it does not address one proximity effect—the iso-dense bias problem caused by variations in focus condition. The variations in focus condition become significant when an off-axis illumination scheme (one of the three major resolution enhancement technologies) is optimized for greatest depth of focus of densely placed features. Sub-resolution assist features (SRAFs) can be inserted into the layout design to provide a dense-like environment for isolated features. SRAFs, sometimes also known as "scattered bars," are sub-resolution features not meant to print. They must be carefully adjusted in size and position so that they never print over the needed process window. This determines an important trade-off in SRAF generation and placement: making the assist features as large and dense as possible in order to create a more dense-like mask pattern, but not so large or dense that they print. Just like the edge-adjustment-based OPC approach, there are rule-based SRAF and model-based SRAF methods. The SRAF insertion is typically performed before or during the edge-adjustment-based OPC process.

Resolution Enhancement Tool

Figure 4:
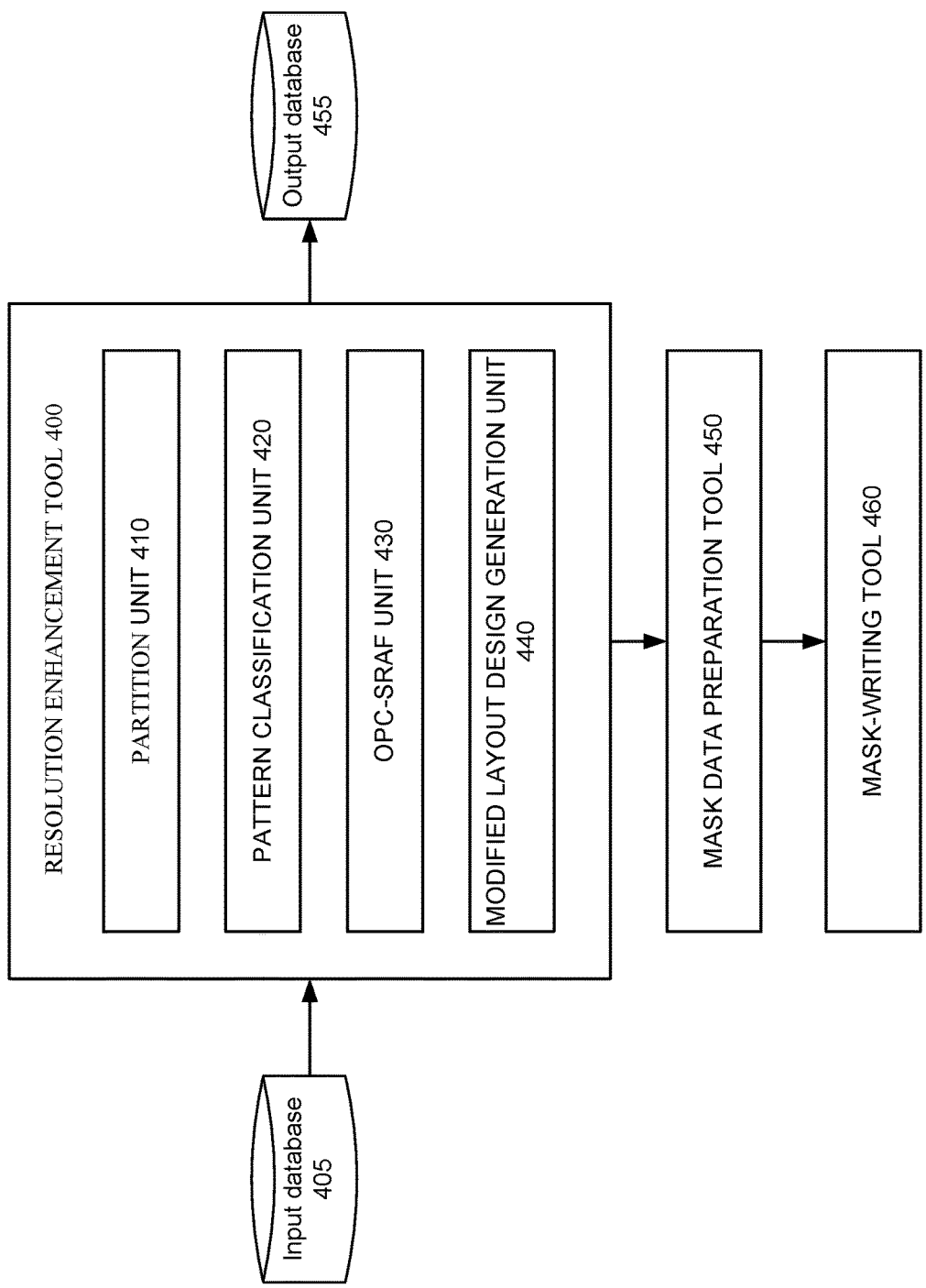
FIG. 4 illustrates an example of a resolution enhancement tool according to various embodiments of the disclosed technology.

FIG. 4 illustrates an example of a resolution enhancement tool 400 that may be implemented according to various embodiments of the disclosed technology. As seen in this figure, the resolution enhancement tool 400 includes a partition unit 410, a pattern classification unit 420, an OPC-SRAF unit 430, and a modified layout design generation unit 440. Some implementations of the resolution enhancement tool 400 may cooperate with (or incorporate) one or more of a mask data preparation tool 450, a mask-writing tool 460, an input database 405 and an output database 455.

As will be discussed in more detail below, the resolution enhancement tool 400 receives a layout design from the input database 405. The partition unit 410 partitions surrounding areas for a plurality of geometric layout elements in the layout design into geometric space elements. The surrounding areas are layout areas having no geometric layout elements. The pattern classification unit 420 performs pattern classification to divide the plurality of geometric layout elements into geometric layout element groups and the geometric space elements into geometric space element groups based on layout patterns of which each comprises one of the plurality of the geometric layout elements and layout patterns of which each comprises one of the geometric space elements, respectively. The OPC-SRAF unit 430 performs optical proximity correction on layout patterns of which each comprises one of one or more members in one of the geometric layout element groups and sub-resolution assist feature insertion on layout patterns of which each comprises one of one or more members in one of the geometric space element groups. The modified layout design generation unit 440 first extracts a modified geometric layout element for each of the geometric layout element groups from results of the optical proximity correction and sub-resolution assist features for each of the geometric space element groups from results of the sub-resolution assist feature insertion. The modified layout design generation unit 440 then generates a modified layout design, which comprises replacing the plurality of geometric layout elements with the corresponding modified layout elements and inserting into the geometric space elements the corresponding sub-resolution assist features. The resolution enhancement tool 400 stores information of the modified layout design in the output database 455. The mask data preparation tool 450 can process the final modified layout design to generate mask data. The mask-writing tool 460 can use the mask data to make photomasks.

As previously noted, various examples of the disclosed technology may be implemented by one or more computing systems, such as the computing system illustrated in FIGS. 1 and 2. Accordingly, one or more of the partition unit 410, the pattern classification unit 420, the OPC-SRAF unit 430, the modified layout design generation unit 440 and the mask data preparation tool 450 may be implemented by executing programming instructions on one or more processors in one or more computing systems, such as the computing system illustrated in FIGS. 1 and 2. Correspondingly, some other embodiments of the disclosed technology may be implemented by software instructions, stored on a non-transitory computer-readable medium, for instructing one or more programmable computers/computer systems to perform the functions of one or more of the partition unit 410, the pattern classification unit 420, the OPC-SRAF unit 430, the modified layout design generation unit 440 and the mask data preparation tool 450. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It also should be appreciated that, while the partition unit 410, the pattern classification unit 420, the OPC-SRAF unit 430, the modified layout design generation unit 440 and the mask data preparation tool 450 are shown as separate units in FIG. 4, a single computer (or a single processor within a master computer) or a single computer system may be used to implement some or all of these units at different times, or components of these units at different times.

With various examples of the disclosed technology, the input database 405 and the output database 455 may be implemented using any suitable computer readable storage device. That is, either of the input database 405 and the output database 455 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 405 and the output database 455 are shown as separate units in FIG. 4, a single data storage medium may be used to implement some or all of these databases.

Pattern-Based Resolution Enhancement

Figure 5:
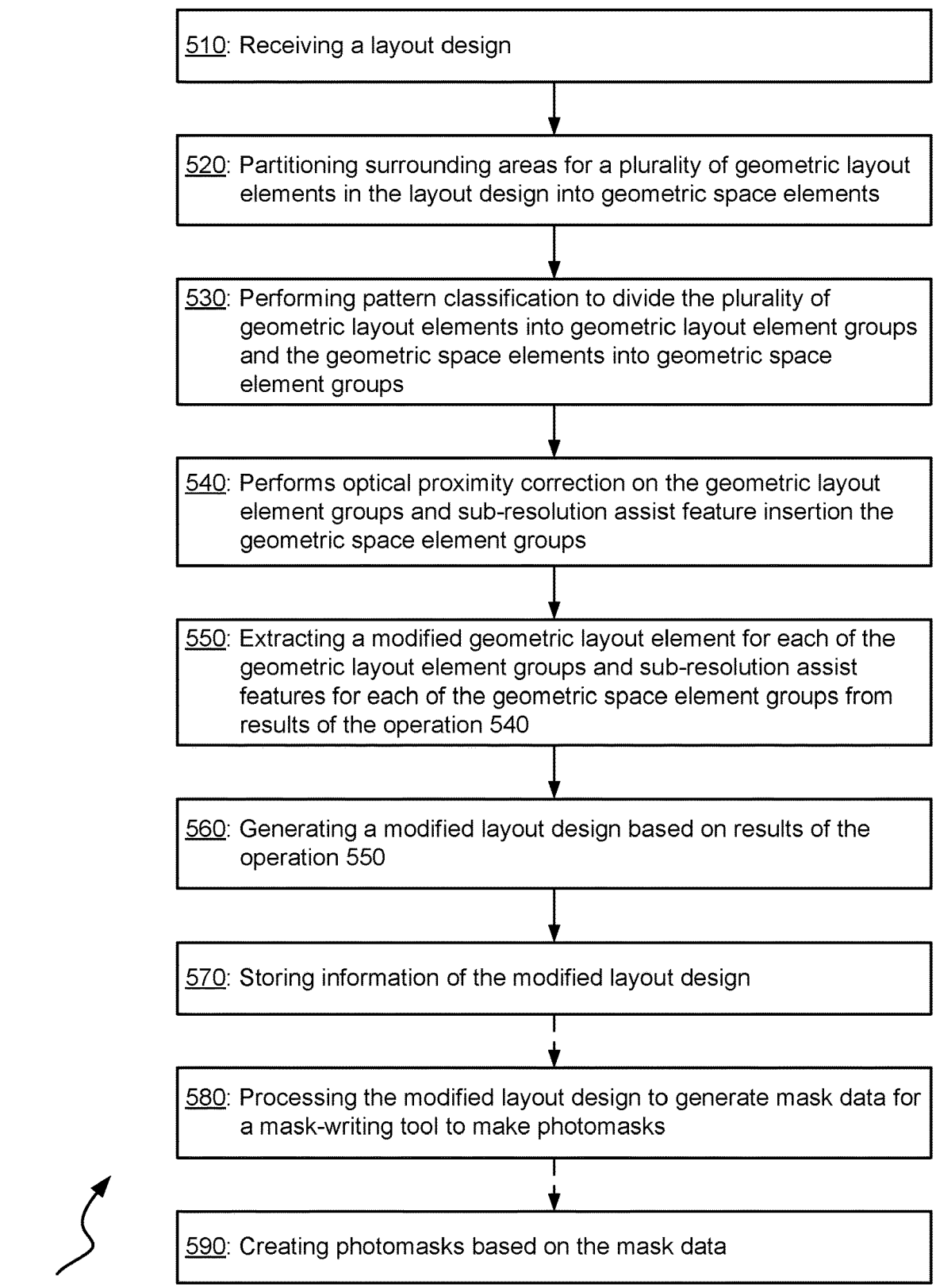
FIG. 5 illustrates a flowchart showing a process of pattern-based optical proximity correction that may be implemented according to various examples of the disclosed technology.

FIG. 4 illustrates a flowchart 400 showing a process of pattern-based resolution enhancement that may be implemented according to various examples of the disclosed technology. For ease of understanding, methods of pattern-based resolution enhancement that may be employed according to various embodiments of the disclosed technology will be described with reference to the resolution enhancement tool 400 in FIG. 4 and the flow chart 500 illustrated in FIG. 5. It should be appreciated, however, that alternate implementations of a resolution enhancement tool may be used to perform the methods of pattern-based resolution enhancement illustrated by the flow chart 500 according to various embodiments of the disclosed technology. Likewise, the resolution enhancement tool 400 may be employed to perform other methods of pattern-based resolution enhancement according to various embodiments of the disclosed technology.

In operation 510 of the flow chart 500, the resolution enhancement tool 400 receives a layout design from the input database 405. The layout design, derived from a circuit design, may be in the GDSII standard format. The layout design can be one for a whole layer of a full-chip layout design or a portion of a layer.

Figure 6:
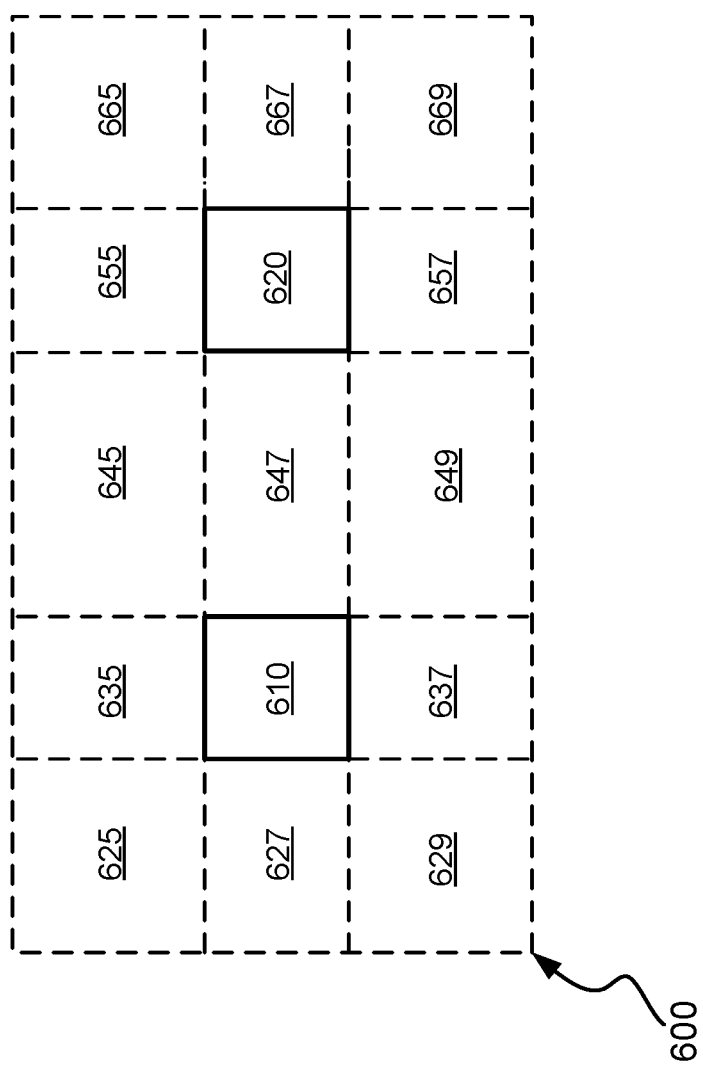
FIG. 6 illustrates an example of partitioning surrounding area of a geometric layout element according to some embodiments of the disclosed technology.

In operation 520, the partition unit 410 partitions surrounding areas for a plurality of geometric layout elements in the layout design into geometric space elements. The surrounding areas are layout areas having no geometric layout elements. Sometimes they are also referred to as layout space areas. FIG. 6 illustrates an example of the surrounding area partitioning according to some embodiments of the disclosed technology. In the figure, a geometric layout element has two square-shaped features 610 and 620. These square-shaped layout features are vias (Latin for path or way, also known as vertical interconnect access). A via is an electrical connection between layers in a physical electronic circuit that goes through the plane of one or more adjacent layers. The boundary (or extent) of a layout clip 600 (sometimes referred to as layout window) and the edges of the vias 610 and 620 define a surrounding area. The size of the clip 600 may be determined based on where sub-resolution assist features are typically inserted.

As FIG. 6 shows, the surrounding area for the two vias 610 and 620 is partitioned into thirteen geometric space elements 625-669. In this example, the division is accomplished by extending the edges of the vias 610 and 620 to the extent of the clip 600. It should be appreciated that this partition approach is just an example and that many other approaches can be adopted.

Figure 7A:
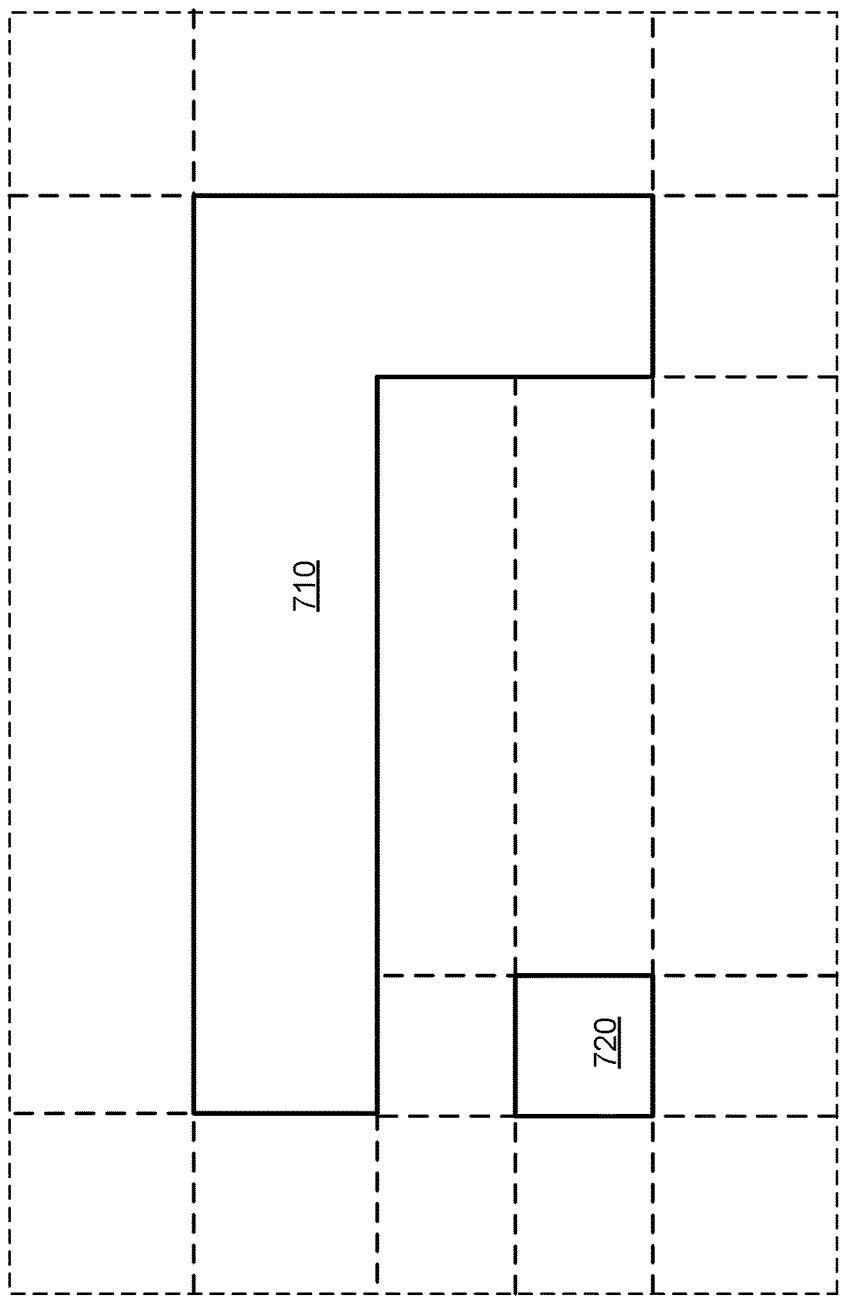
FIG. 7A illustrates another example of partitioning surrounding area of a geometric layout element according to some embodiments of the disclosed technology.
Figure 7B:
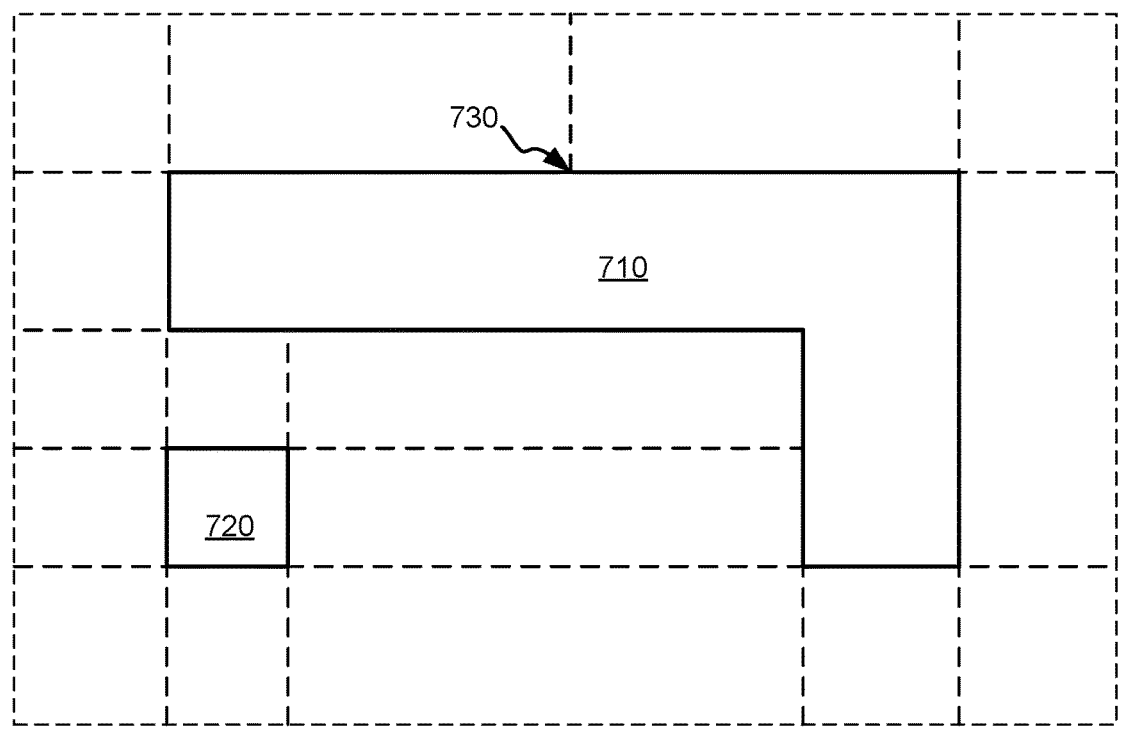
FIG. 7B illustrates still another example of partitioning surrounding area of a geometric layout element according to some embodiments of the disclosed technology.

FIG. 7A illustrates another example of the partitioning. In the figure, a geometric layout element has two layout features 710 and 720. The partitioning is also executed through extending the edges of the two layout features 710 and 720. FIG. 7B illustrates a slightly different approach for the partitioning. An additional partitioning line is added at the middle point 730 of the top horizontal edge of the layout feature 710. This may be beneficial when the layout feature 710 is long along the horizontal direction. With various implementations of the disclosed technology, the partition operation 520 attempts to generate the geometric space elements that can be classified into a small number of geometric space element groups. As discussed below, this can facilitate speeding up the resolution enhancement process and obtaining consistent results for similar layout patterns.

Figure 7C:
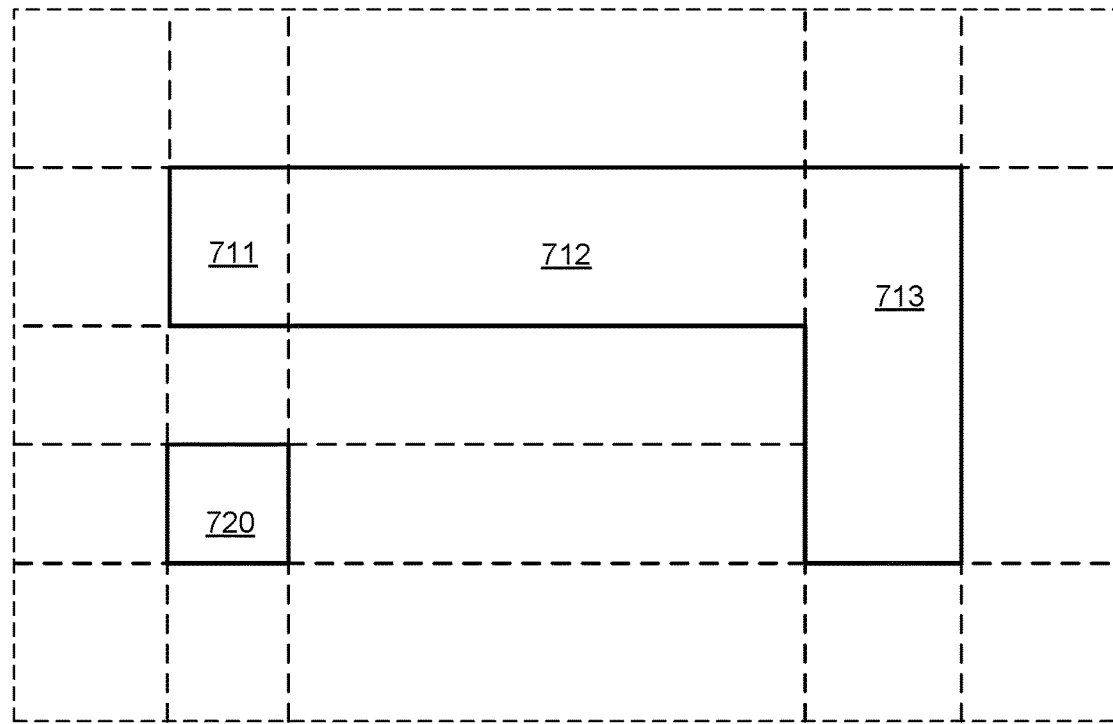
FIG. 7C illustrates an example of partitioning an original geometric layout element into several geometric layout elements.

In some embodiments of the disclosed technology, some or all of the plurality of geometric layout elements are themselves derived by partitioning the original geometric layout elements. For example, a long layout shape serving as an interconnect line may be divided into several segments. FIG. 7C illustrates such an example. The original layout feature 710 is divided into three segments 711, 712, and 713. Accordingly, the partitioning result of the surrounding area is also different from FIG. 7A and FIG. 7B. Like the partitioning of space areas, the partitioning of the geometric layout elements is to generate the geometric layout elements that can be classified into a small number of geometric layout element groups. The fewer the number of the geometric layout element groups, the fewer number the optical proximity correction operations. It should be noted that different partitioning approaches can be employed for different layout designs to achieve optimal results.

In operation 530, the pattern classification unit 420 performs pattern classification to divide the plurality of geometric layout elements into geometric layout element groups and the geometric space elements into geometric space element groups based on layout patterns of which each comprises one of the plurality of the geometric layout elements and layout patterns of which each comprises one of the geometric space elements, respectively. Two identical geometric layout elements may have different optical proximity correction results if they are placed in different environments due to possible optical proximity effects from nearby geometric layout elements. Similarly, different sub-resolution assist features may need to be inserted into two geometric space elements having the same shape but in different environments. Therefore, the classification operation 530 does not just compare the geometric layout elements/geometric space elements themselves but a layout pattern larger than the geometric layout element/geometric space element of interest for pattern classification.

Figure 8A:
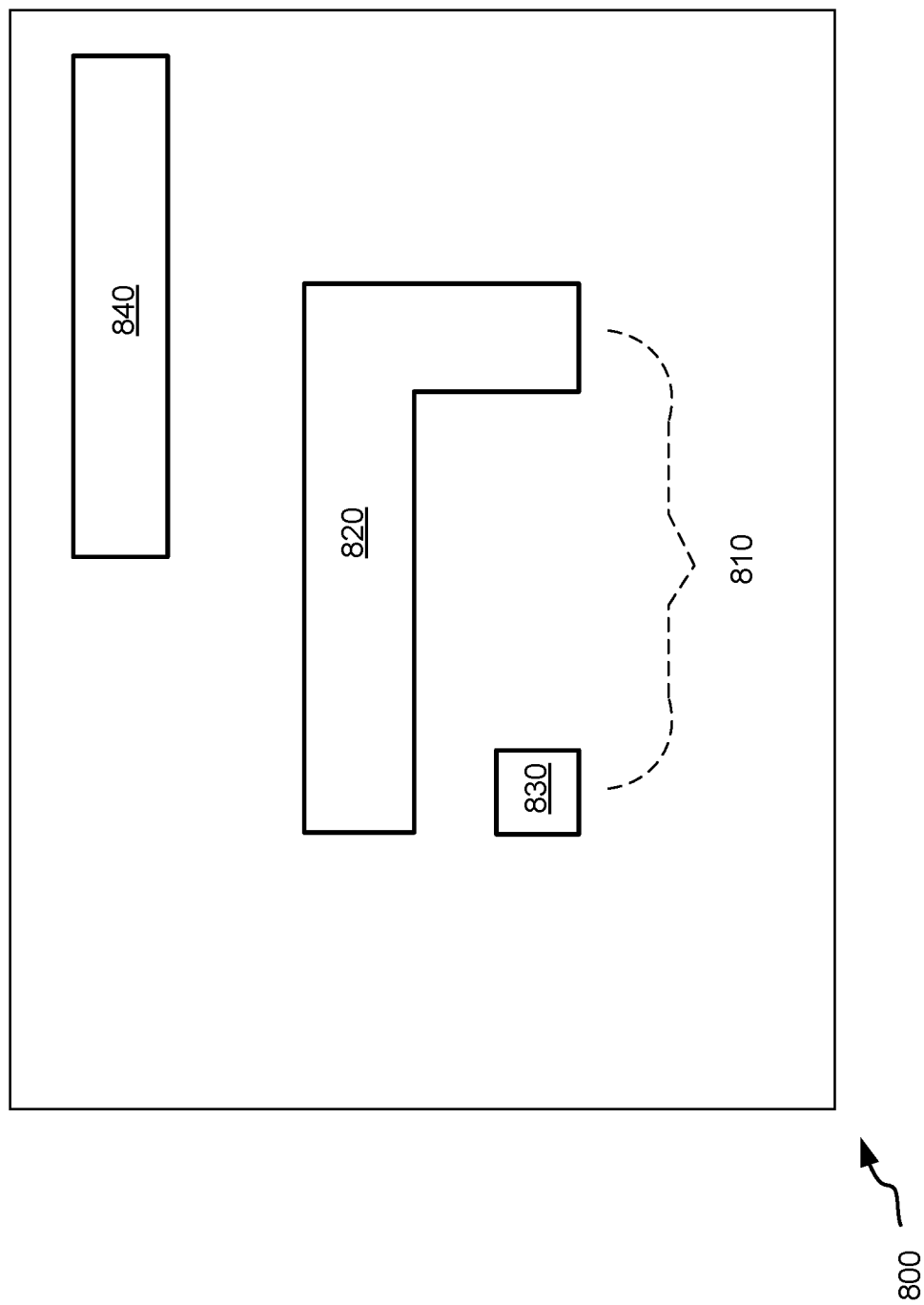
FIG. 8A illustrates an example of a layout pattern comprising a geometric layout element which can be used for pattern matching in order to classify the geometric layout element according to some embodiments of the disclosed technology.

FIG. 8A illustrates an example of a layout pattern 800 comprising a geometric layout element 810 which the pattern classification unit 420 can use for pattern matching in order to classify the geometric layout element 810. Here the geometric layout element 810 comprises two layout features 820 and 830, like the geometric layout element shown in FIG. 7A. The layout pattern 800 is centered at the geometric layout element 810. The size of the layout pattern 800 may be determined based on whether a nearby geometric layout element can affect the results of subsequent optical proximity correction/SRAF insertion performed on the geometric layout element/geometric space element of interest. For example, if a nearby geometric layout element is away from the boundary of the geometric layout element by a certain value such as one or several times of the resolution half pitch ($R=k_1\lambda/NA$, where $\lambda$ is the wavelength (e.g., 193 nm), $k_1$ is a constant process factor and NA is the numerical aperture), then the layout pattern 800 does not need to extend to include it, and vice versa. In FIG. 8A, a geometric layout element 840 is included as the spacing between the geometric layout element 840 and the geometric layout element 810 is a preset value. In some cases, a geometric layout element neighboring the geometric layout element 840 may also need to be included because its presence affects the OPC result of the geometric layout element 840, which can in turn affect the OPC result of the geometric layout element 810.

Figure 8B:
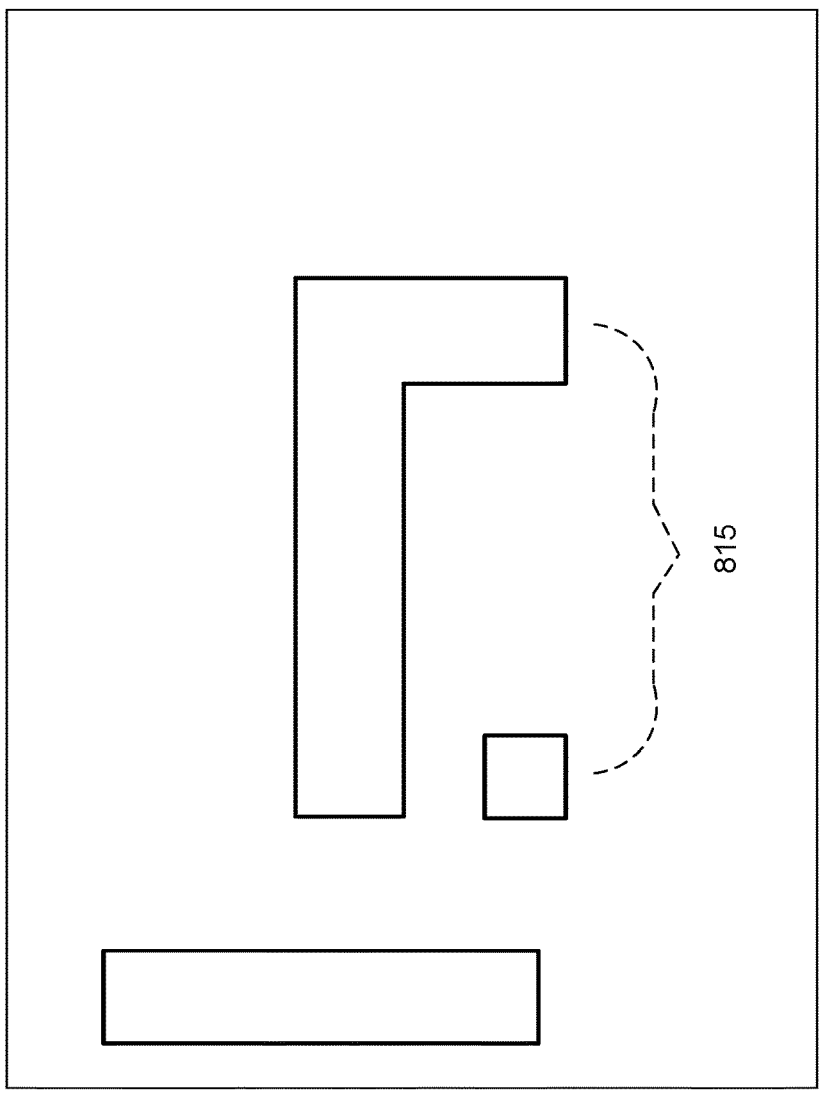
FIG. 8B illustrates another example of a layout pattern different from the layout pattern shown in FIG. 8A but comprising the same geometric layout element as in FIG. 8A.

FIG. 8B illustrates another example of a layout pattern 805 comprising a geometric layout element 815 which the pattern classification unit 420 can use for pattern matching in order to classify the geometric layout element 815. The geometric layout element 815 exactly matches the geometric layout element 810 shown in FIG. 8A, but the layout pattern 805 is apparently different from the layout pattern 800 shown in FIG. 8A due to the other geometric layout elements in them. After patterning matching, therefore, the pattern classification unit 420 will place the geometric layout elements 810 and 815 into two different geometric layout element groups.

Figure 8C:
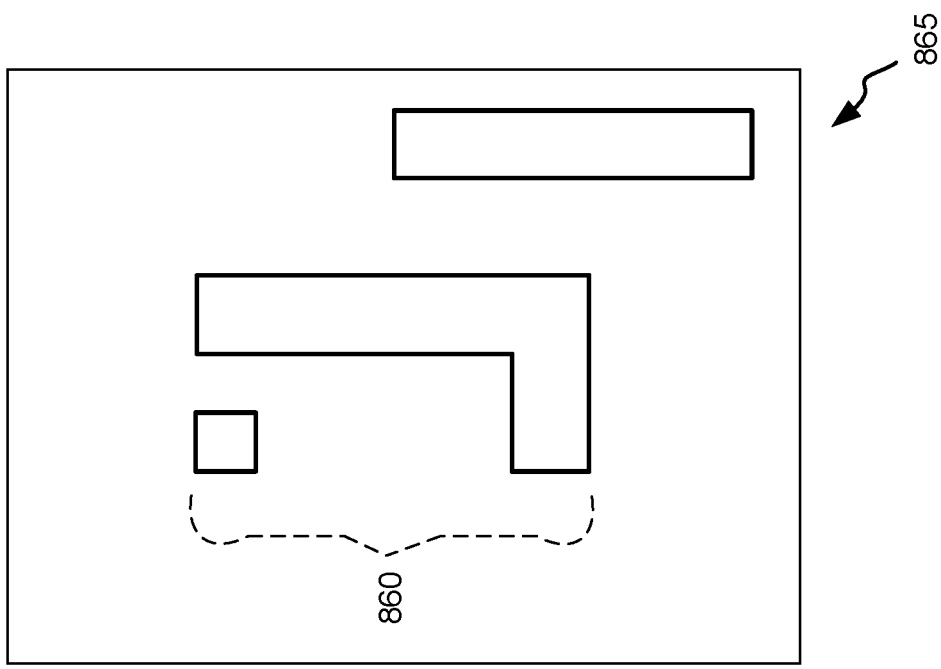
FIG. 8C illustrates another example of two rotational variants of the layout pattern shown in FIG. 8A.
Figure 8C:
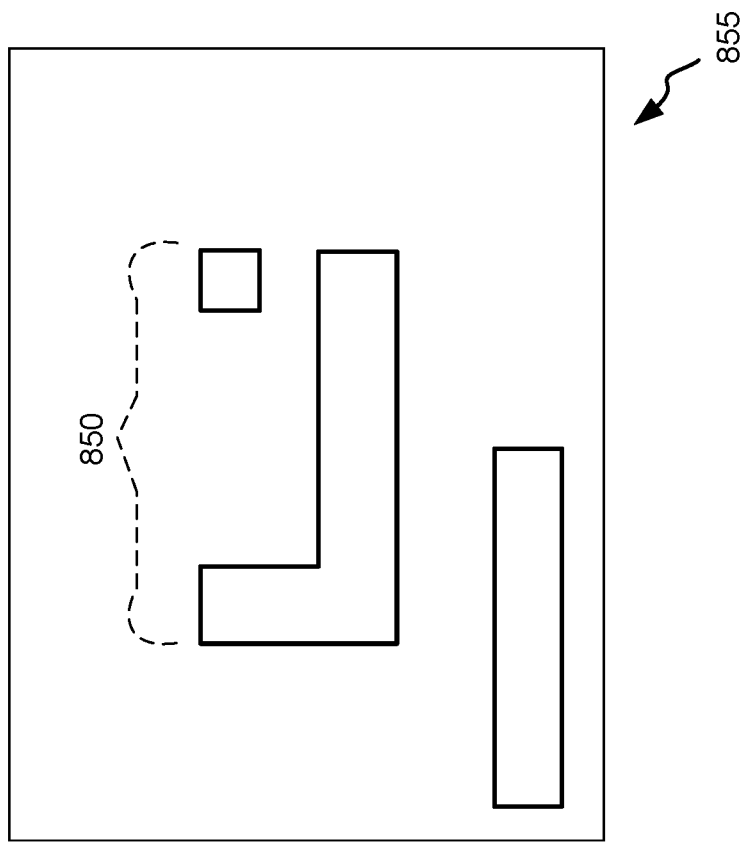

FIG. 8C shows two layout patterns 855 and 865, which include geometric layout elements 850 and 860, respectively. The geometric layout elements 850 and 860 are identical to the geometric layout element 810 except for the orientations. Moreover, the layout patterns 855 and 865 are just rotational variants of the layout pattern 800 (one obtained by rotating 90 degree clockwise and the other by 180 degree). As such, the pattern classification unit 420 will group the geometric layout elements 800, 850 and 860 together. Each geometric layout element in a geometric layout element group may be represented by its location and orientation information (e.g., rotational, mirror image, or both), which can be utilized by subsequent operations.

The pattern classification unit 420 can use various approaches for pattern classification such as vertex/edge-based and density-based. The pattern classification unit 420 may be implemented by a commercial pattern matching tool such as those in the Calibre family of software tools available from Mentor Graphics Corporation, Wilsonville, Oreg.

In operation 540, the OPC-SRAF unit 430 performs optical proximity correction on layout patterns of which each comprises one of one or more members in one of the geometric layout element groups and sub-resolution assist feature insertion on layout patterns of which each comprises one of one or more members in one of the geometric space element groups. In the previous operation, pattern classification is performed on a layout pattern larger than the geometric layout/space element of interest for the accurate classification due to its interaction with the environment. Similarly, optical proximity correction/sub-resolution assist feature insertion in the present operation needs to be performed on a layout pattern larger than the geometric layout/space element of interest to obtain an optimal result. The layout patterns in the present operation may be the same as those used in the operation 540.

Alternatively, the layout patterns in the present operation may be larger than those used in the operation 540. For example, a layout pattern for a geometric layout element of interest in the classification operation contains other layout elements that are within a predetermined distance from the edges of the geometric layout element of interest, whereas a layout pattern for a geometric layout element of interest in the OPC operation contains other layout elements that are within three times of the predetermined distance from the edges of the geometric layout element of interest. Using this approach, the optical proximity correction results for the geometric layout elements in the same geometric layout element group may be slightly different, which can be addressed by the next operation.

The OPC-SRAF unit 430 may employ various optical proximity correction/sub-resolution assist feature insertion techniques such as rule-based, model-based, or a combination of both for classifying the geometric layout element/geometric space elements. The OPC-SRAF unit 430 may also employ the inverse lithography-based OPC technology. Inverse lithography treats optical proximity correction as an inverse imaging problem and can provide unintuitive mask patterns. Some aspects of the lithography-based OPC are discussed in an article by J Word et al., "Inverse vs. traditional OPC for the 22 nm node", Proc. Of SPIE, Vol. 7274, 2009, which is incorporated herein by reference. Inverse lithography can generates modified geometrical elements and needed sub-resolution assist features simultaneously. The OPC-SRAF unit 430 may be implemented by a commercial resolution enhancement tool such as those in the Calibre family of software tools available from Mentor Graphics Corporation, Wilsonville, Oreg.

In operation 550, the modified layout design generation unit 440 extracts a modified geometric layout element for each of the geometric layout element groups from results of the optical proximity correction and sub-resolution assist features for each of the geometric space element groups from results of the sub-resolution assist feature insertion. The layout pattern 800 in FIG. 8A is used as an example to explain the operation. The OPC-SRAF unit 430 performs optical proximity correction on all of the layout features 820, 830 and 840 in the previous operation. In the present operation, the modified layout design generation unit 440 extracts only the optical proximity correction result for the layout features 820 and 830 for the next operation.

In operation 560, the modified layout design generation unit 440 generates a modified layout design. The generation operation comprises replacing the plurality of geometric layout elements with the corresponding modified layout elements and inserting into the geometric space elements the corresponding extracted sub-resolution assist features. In the example above, the optical proximity correction result for the layout features 820 and 830 may be applied to all members in the same geometric layout element group such as the geometric layout elements 810 in FIG. 8A and 850 and 860 in FIG. 8C based on their location and orientation information.

When there are slightly different results for one single geometric layout element group due to larger layout patterns being used in the operation 540 than in the operation 530, the modified layout design generation unit 440 may use an average of the results for the consistency desired by users. The averaging may be a weighted averaging operation. The weight of a certain layout pattern may be based on the number of the geometric layout elements in the geometric layout element group sharing the layout pattern.

In operation 570, the resolution enhancement tool 400 stores information of the modified layout design in the output database 455.

Optionally, in operation 580, the mask data preparation tool 450 processes the modified layout design to generate mask data for a mask-writing tool to make photomasks. The mask-writing tool can be raster scan-based—either electron beams or laser beams constantly scan in a predetermined pattern. In this approach, the mask data preparation tool 450 converts the layout data into primitive shapes (rectangles and trapezoids), which is sometimes referred to as mask data fracturing. Alternatively, the mask-writing tool can use a variable-shaped beam—a larger beam is shaped by an aperture into a primitive shape (usually a rectangle or a trapezoid), and the image of the aperture is projected in individual "flashes" at appropriate locations. For this approach, the mask data preparation tool 450 fractures the layout design into shots of acceptable size and the appropriate stage motion instructions for creating the pattern. Additionally, the mask data preparation tool 450 may perform mask process correction (MPC). Although the photomask features are typically used in a 4× reduction system, and the feature dimensions are thus 4*x* larger than on the wafer, there is still need to accurately fabricate SRAF and other OPC jogs and structures that are significantly smaller. Mask process correction attempts to correct charged particle proximity effects.

Still optionally, in operation 590, the mask-writing tool 460 uses the mask data to create photomasks. The photomasks can be used to fabricate chips through photolithography.

Circuit designs usually have many instances of some basic building blocks. For example, standard cell methodology is used for designing application-specific integrated circuits (ASICs) with mostly digital-logic features. A low-level very-large-scale integration (VLSI) layout is encapsulated into an abstract logic representation (such as a NAND gate). Cell-based methodology—the general class to which standard cells belong makes it possible for one designer to focus on the high-level (logical function) aspect of digital design, while another designer focuses on the implementation (physical) aspect. Due to this design methodology, a layout design tend to have many repeating layout patterns. This is particularly true for memory designs. The disclosed technology reduce a large layout design into a plurality of geometric layout/space element groups and the resolution enhancement needs only to be operated on one or several representatives from each of the groups. This can not only speed up the whole process but also help achieve the processing consistency. The disclosed technology may be employed to process a part of a layout design which has many repetitive geometric layout elements. The rest may be processed using a different approach.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. A method, executed by at least one processor of a computer, comprising:
   receiving a layout design;
   partitioning surrounding areas for a plurality of geometric layout elements in the layout design into geometric space elements, the surrounding areas being layout areas having no geometric layout elements;
   performing pattern classification to divide the plurality of geometric layout elements into geometric layout element groups and the geometric space elements into geometric space element groups based on layout patterns of which each comprises one of the plurality of the geometric layout elements and layout patterns of which each comprises one of the geometric space elements, respectively;
   performing optical proximity correction on layout patterns of which each comprises one of one or more members in one of the geometric layout element groups and sub-resolution assist feature insertion on layout patterns of which each comprises one of one or more members in one of the geometric space element groups;
   extracting a modified geometric layout element for each of the geometric layout element groups from results of the optical proximity correction and sub-resolution assist features for each of the geometric space element groups from results of the sub-resolution assist feature insertion;
   generating a modified layout design, the generating comprising replacing the plurality of geometric layout elements with the corresponding modified layout elements and inserting into the geometric space elements the corresponding extracted sub-resolution assist features; and
   storing information of the modified layout design.

2. The method recited in claim 1, further comprising:
   processing the modified layout design to generate mask data for a mask-writing tool to make photomasks.

3. The method recited in claim 2, further comprising:
   applying the mask data to the mask-writing tool to create photomasks.

4. The method recited in claim 1, wherein some or all of the plurality of geometric layout elements are obtained by fracturing original geometric layout elements in the layout design.

5. The method recited in claim 1, wherein the layout pattern comprising a geometric layout element for the optical proximity correction operation is larger than the corresponding layout pattern for the pattern classification operation.

6. The method recited in claim 1, wherein the plurality of geometric layout elements are a sub-set of geometric layout elements in the layout design.

7. The method recited in claim 1, wherein the optical proximity correction, the sub-resolution assist feature insertion, or both are rule-based, model-based, inversion-lithography-based, or any combination thereof.

8. One or more non-transitory computer-readable media storing computer-executable instructions for causing one or more processors to perform a method, the method comprising:
   receiving a layout design;
   partitioning surrounding areas for a plurality of geometric layout elements in the layout design into geometric space elements, the surrounding areas being layout areas having no geometric layout elements;
   performing pattern classification to divide the plurality of geometric layout elements into geometric layout element groups and the geometric space elements into geometric space element groups based on layout patterns of which each comprises one of the plurality of the geometric layout elements and layout patterns of which each comprises one of the geometric space elements, respectively;
   performing optical proximity correction on layout patterns of which each comprises one of one or more members in one of the geometric layout element groups and sub-resolution assist feature insertion on layout patterns of which each comprises one of one or more members in one of the geometric space element groups;
   extracting a modified geometric layout element for each of the geometric layout element groups from results of the optical proximity correction and sub-resolution assist features for each of the geometric space element groups from results of the sub-resolution assist feature insertion;
   generating a modified layout design, the generating comprising replacing the plurality of geometric layout elements with the corresponding modified layout elements and inserting into the geometric space elements the corresponding extracted sub-resolution assist features; and storing information of the modified layout design.

9. The one or more non-transitory computer-readable media recited in claim 8, wherein the method further comprises: processing the modified layout design to generate mask data for a mask-writing tool to make photomasks.

10. The one or more non-transitory computer-readable media recited in claim 9, wherein the method further comprises: applying the mask data to the mask-writing tool to create photomasks.

11. The one or more non-transitory computer-readable media recited in claim 8, wherein some or all of the plurality of geometric layout elements are obtained by fracturing original geometric layout elements in the layout design.

12. The one or more non-transitory computer-readable media recited in claim 8, wherein the layout pattern comprising a geometric layout element for the optical proximity correction operation is larger than the corresponding layout pattern for the pattern classification operation.

13. The one or more non-transitory computer-readable media recited in claim 8, wherein the plurality of geometric layout elements are a sub-set of geometric layout elements in the layout design.

14. The one or more non-transitory computer-readable media recited in claim 8, wherein the optical proximity correction, the sub-resolution assist feature insertion, or both are rule-based, model-based, inversion-lithography-based, or any combination thereof.

15. A system, comprising:
one or more processors, the one or more processors programmed to perform a method, the method comprising:
receiving a layout design;
partitioning surrounding areas for a plurality of geometric layout elements in the layout design into geometric space elements, the surrounding areas being layout areas having no geometric layout elements;
performing pattern classification to divide the plurality of geometric layout elements into geometric layout element groups and the geometric space elements into geometric space element groups based on layout patterns of which each comprises one of the plurality of the geometric layout elements and layout patterns of which each comprises one of the geometric space elements, respectively;
performing optical proximity correction on layout patterns of which each comprises one of one or more members in one of the geometric layout element groups and sub-resolution assist feature insertion on layout patterns of which each comprises one of one or more members in one of the geometric space element groups;
extracting a modified geometric layout element for each of the geometric layout element groups from results of the optical proximity correction and sub-resolution assist features for each of the geometric space element groups from results of the sub-resolution assist feature insertion;
generating a modified layout design, the generating comprising replacing the plurality of geometric layout elements with the corresponding modified layout elements and inserting into the geometric space elements the corresponding extracted sub-resolution assist features; and
storing information of the modified layout design.

16. The system recited in claim 15, wherein the method further comprises: processing the modified layout design to generate mask data for a mask-writing tool to make photomasks.

17. The system recited in claim 16, wherein the method further comprises: applying the mask data to the mask-writing tool to create photomasks.

18. The system recited in claim 15, wherein some or all of the plurality of geometric layout elements are obtained by fracturing original geometric layout elements in the layout design.

19. The system recited in claim 15, wherein the layout pattern comprising a geometric layout element for the optical proximity correction operation is larger than the corresponding layout pattern for the pattern classification operation.

20. The system recited in claim 15, wherein the optical proximity correction, the sub-resolution assist feature insertion, or both are rule-based, model-based, inversion-lithography-based, or any combination thereof.

* * * * *